(12) United States Patent
Parkins

(10) Patent No.: US 12,429,603 B2
(45) Date of Patent: Sep. 30, 2025

(54) GNSS POSITIONING BASED ON CHANGES IN CARRIER RANGE

(71) Applicant: u-blox AG, Thalwil (CH)

(72) Inventor: Alex Parkins, Thalwil (CH)

(73) Assignee: u-blox AG, Thalwil (CH)

( * ) Notice: Subject to any disclaimer, the term of this patent is extended or adjusted under 35 U.S.C. 154(b) by 422 days.

(21) Appl. No.: 18/108,757

(22) Filed: Feb. 13, 2023

(65) Prior Publication Data

US 2023/0266476 A1 Aug. 24, 2023

(30) Foreign Application Priority Data

Feb. 21, 2022 (EP) ..................................... 22157827

(51) Int. Cl.
  *G01S 19/25* (2010.01)
(52) U.S. Cl.
  CPC .......... *G01S 19/258* (2013.01); *G01S 19/252* (2013.01)
(58) Field of Classification Search
  CPC ............................. G01S 19/258; G01S 19/252
  See application file for complete search history.

(56) References Cited

U.S. PATENT DOCUMENTS

| 2007/0052583 A1* | 3/2007 | Zhodzishsky | ........... G01S 19/51 342/357.24 |
| 2013/0271318 A1 | 10/2013 | Doucet et al. | |
| 2017/0212242 A1* | 7/2017 | Weed | ...................... G01S 19/15 |

FOREIGN PATENT DOCUMENTS

WO    WO 2011/034624    3/2011

OTHER PUBLICATIONS

Extended Search Report in European Appln. No. 22157827.1, dated Aug. 25, 2022, 8 pages.
Klobuchar, "Ionospheric Time-Delay Algorithms for Single-Frequency GPS Users," IEEE Transactions on Aerospace and Electronic Systems, 1987, AES-23(3):325-331.

\* cited by examiner

*Primary Examiner* — William Kelleher
*Assistant Examiner* — Hailey R Le
(74) *Attorney, Agent, or Firm* — Fish & Richardson P.C.

(57) ABSTRACT

A GNSS receiver, a method of estimating position, and an associated computer program are provided. An example method includes calculating a first (full) position solution based on pseudorange measurements made at a first time. One or more position updates are then calculated based on the first position solution, using delta carrier range measurements which compare first carrier range measurements, made at the first time, with second carrier range measurements, made at a second time. When calculating the one or more position updates, the delta carrier range measurements may be corrected to compensate for satellite motion between the first time and the second time. Corrections may also be made to compensate for changes in ionospheric delay.

15 Claims, 5 Drawing Sheets

GNSS POSITIONING BASED ON CHANGES IN CARRIER RANGE

CROSS-REFERENCE TO RELATED APPLICATIONS

This application claims priority to European Application No. 22157827.1, filed on Feb. 21, 2022, the contents of which are incorporated herein by reference in their entirety.

FIELD OF THE INVENTION

The present invention relates to positioning using Global Navigation Satellite Systems (GNSS). In particular, it relates to positioning using carrier range measurements of GNSS signals.

BACKGROUND OF THE INVENTION

Techniques for GNSS positioning are well known in the art. Each GNSS positioning technique requires at least one GNSS—some examples of which include the Global Positioning System (GPS), Galileo, GLONASS, and the BeiDou Navigation Satellite System (BDS), also known simply as "BeiDou". Each GNSS comprises a constellation of satellites, also known in the art as "space vehicles" (SVs), which orbit the Earth. A traditional GNSS positioning technique may comprise calculating a pseudorange from a GNSS receiver to each in-view SV. Such a traditional positioning technique may be a code-based positioning technique, wherein the code phase of a pseudorandom noise (PRN) code, modulated onto a carrier signal transmitted by an SV, is measured. The pseudoranges are used to calculate the position of the GNSS receiver by multilateration, based on the GNSS signals transmitted from at least four SVs and received by the GNSS receiver.

To enhance accuracy compared with code-based positioning, it is known to use carrier-based positioning techniques, wherein carrier range measurements (also known as carrier-phase ranging measurements or carrier phase measurements) are used to calculate position. By deriving ranging measurements from the carrier signal, a calculation of the position can be achieved to greater precision.

SUMMARY OF THE INVENTION

It would be desirable to calculate position frequently, to accurately track the movements of a GNSS receiver. However, calculation of a full position fix based on pseudorange and carrier range measurements may be computationally expensive, leading to demands on computational resources and power consumption. It would be desirable to enable regular position updates in a manner that does not involve the computational complexity of a full position fix. Such a technique could be used to reduce power consumption, reduce complexity and/or reduce cost of a GNSS receiver (for example, by replacing a processor with a less expensive, lower power device). Alternatively, for a fixed level of computational resource, such a technique could be used to increase the rate (frequency) at which position updates can be made available. In conjunction with these goals, it would also be desirable to produce position updates with reduced latency—that is, with reduced delay or processing time between the moment that GNSS measurements are made and the moment when a position estimate based on those measurements is output.

A GNSS receiver, a method of estimating position, and an associated computer program are provided. The method comprises calculating a first (full) position solution based on pseudorange measurements made at a first time. One or more position updates are then calculated based on the first position solution, using delta carrier range measurements which compare first carrier range measurements, made at the first time, with second carrier range measurements, made at a second time. When calculating the one or more position updates, the delta carrier range measurements may be corrected to compensate for satellite motion between the first time and the second time. Corrections may also be made to compensate for changes in ionospheric delay.

The invention is defined by the claims. According to a first aspect, there is provided a method of estimating a position of a GNSS receiver based on GNSS signals, the method comprising:

obtaining first GNSS measurements made by a signal processing unit of the GNSS receiver at a first position and a first time, the first GNSS measurements comprising first pseudorange measurements and first carrier range measurements associated with a plurality of GNSS satellites observed by the GNSS receiver;

obtaining satellite ephemeris data for at least one satellite among the plurality of satellites;

estimating a first satellite position and a first satellite velocity for the at least one satellite, for the first time, based on the obtained satellite ephemeris data;

calculating a first position solution for the GNSS receiver, based on the first GNSS measurements;

obtaining second GNSS measurements made by the signal processing unit of the GNSS receiver at a second position and a second time, the second GNSS measurements comprising second carrier range measurements associated with the plurality of GNSS satellites;

predicting a change in satellite position for the at least one satellite between the first time and the second time, based on the first satellite position and the first satellite velocity;

determining, for each of the plurality of satellites, a change in carrier range over time, by comparing the first carrier range measurements with the second carrier range measurements;

calculating a position difference between the first position and the second position, based on the determined changes in carrier range and the predicted change in satellite position; and calculating a second position solution for the GNSS receiver, by combining the first position solution with the position difference.

Typically, in examples according to the present disclosure, the second GNSS measurements do not include pseudorange measurements. Therefore, it is not possible to calculate a complete position fix for the second time. This is chosen by design—the system intentionally avoids calculating a complete position fix for the second time, and instead produces a position update that is quicker and easier to calculate.

The position difference may be calculated based on time-differenced carrier range measurements. That is, the change in carrier range over time, between the first carrier range measurements and the second carrier range measurements is used to calculate the change in receiver position. This can allow a rapid but accurate estimation of the position difference.

The first satellite position is the position of the satellite at the first time. Likewise, the first satellite velocity is the velocity of the satellite at the first time. The change in satellite position may be predicted by extrapolating from the first satellite position using the first satellite velocity—for example, according to a constant velocity model. In this way, the method can avoid the need to calculate the satellite position completely, from scratch, thereby estimating the second satellite position (that is, the position of the satellite at the second time) in a computationally efficient manner. Although the change in satellite position, predicted by extrapolating from the first satellite position, may be less accurate than the estimate of the first satellite position, it is nevertheless a good simple approximation and can be expected to be considerably more accurate than ignoring the change in position of the satellite.

In some examples according to the present disclosure, a the position of the satellite at the second time may be estimated in this way for each of the plurality of satellites. The second satellite positions, together with the respective changes in carrier range, may be used to calculate the position difference.

The satellite ephemeris data may be obtained by receiving and decoding a navigation message from the at least one satellite.

In general, in order to calculate a position and time (or change in position and time) exclusively using GNSS signals, it is necessary to obtain GNSS measurements from four satellites. Therefore, the plurality of satellites typically comprises at least four satellites. Similarly, it would typically be necessary to obtain satellite ephemeris data for each of the at least four satellites. The method may comprise predicting a change in satellite position, in the manner summarised above, for each of the at least four satellites.

It should be understood, however, that it is not always necessary to obtain GNSS measurements from four satellites (or to obtain ephemeris data for four satellites). By way of example, GNSS measurements on signals from a smaller number of satellites may suffice if other sources of information are available to help constrain the position calculation—such as terrestrial positioning signals.

In some examples, the first position solution may be calculated based on the first pseudorange measurements (alone), and not based on the first carrier range measurements. In this way, the "full" position fix (for the first position) is calculated using pseudoranges, and the low-latency position update is calculated using carrier range measurements.

The position difference is the change in position of the receiver between the first time and the second time.

The method may further comprise estimating a first satellite acceleration for the at least one satellite, for the first time, based on the obtained satellite ephemeris data. The change in satellite position may be predicted based on the first satellite position, the first satellite velocity, and the first satellite acceleration. Considering satellite acceleration can help to improve accuracy. The prediction may be based on a constant acceleration model, for example.

The method may further comprise determining a satellite clock drift for the at least one satellite between the first time and the second time, based on the obtained satellite ephemeris data, and predicting a change in satellite clock for the at least one satellite between the first time and the second time, based on the satellite clock drift.

The step of calculating the position difference between the first position and the second position may be based on the determined changes in carrier range, the predicted change in satellite position, and the predicted change in satellite clock.

Predicting the change in satellite position optionally comprises: determining a line-of-sight vector between the GNSS receiver and the at least one satellite, based on the first position solution and the first satellite position; projecting the first satellite velocity onto the line-of-sight vector; and predicting the change in satellite position along the line-of-sight vector based on the projected first satellite velocity.

The step of calculating the position difference may comprise adjusting the change in carrier range for the at least one satellite, based on the predicted change in satellite position along the line-of-sight vector.

Predicting the change in satellite position along the line-of-sight vector may optionally be based on the first satellite acceleration as well as the first satellite velocity. The method may comprise projecting the first satellite acceleration onto the line-of-sight vector; and predicting the change in satellite position along the line-of-sight vector based on the projected first satellite velocity and the projected first satellite acceleration.

The direction (that is, angle) of the line-of-sight vector may be assumed constant over the time interval between the first time and the second time. This approximation is valid in part because of the large distance between the satellite and the GNSS receiver, and in part because the time interval is relatively short.

The first position solution may be calculated by a navigation filter. The navigation filter may be a recursive state estimator, such as a Kalman filter.

The second position solution may be calculated by a different filter, for example a second recursive state estimator, such as a second Kalman filter.

The method may further comprise: obtaining third GNSS measurements made by the signal processing unit of the GNSS receiver at a third position and a third time, the third GNSS measurements comprising third carrier range measurements associated with the plurality of GNSS satellites; predicting a change in satellite position for the at least one satellite between the first time and the third time, based on the first satellite position and the first satellite velocity; determining, for each of the plurality of satellites, a change in carrier range over time, by comparing the first carrier range measurements with the third carrier range measurements; calculating a second position difference between the first position and the third position, based on the determined changes in carrier range and the predicted change in satellite position between the first time and the third time; and calculating a third position solution for the GNSS receiver, by combining the first position solution with the second position difference.

A time interval between the second time and the third time may be less than 0.125 s, optionally less than 0.1 s, optionally less than 0.05 s, less than 0.02 s or less than or equal to 0.01 s. Accordingly, a position estimate based on time-differenced carrier range measurements may be calculated with a frequency of more than 8 Hz, optionally more than 10 Hz, optionally more than 20 Hz, more than 50 Hz or greater than or equal to 100 Hz.

The method may further comprise: obtaining fourth GNSS measurements made by the signal processing unit of the GNSS receiver at a fourth position and a fourth time, the fourth GNSS measurements comprising second pseudorange measurements and fourth carrier range measurements associated with a second plurality of GNSS satellites observed by the GNSS receiver; and calculating a fourth position solution for the GNSS receiver, based on the fourth GNSS measurements.

Calculating the fourth position solution may involve running the navigation filter. The second plurality of GNSS satellites may be the same as or different from the original plurality of GNSS satellites. As will be understood by those skilled in the art, individual satellites may come in and out of view of a GNSS receiver over time.

The method may further comprise: obtaining satellite ephemeris data for at least one satellite among the second plurality of satellites; and estimating a fourth satellite position and second satellite velocity for said at least one satellite, for the fourth time, based on the obtained satellite ephemeris data. This fourth satellite position and associated second satellite velocity can be used subsequently for time-differenced carrier range positioning according to the approach outlined already above.

A time interval between the first time and the fourth time may be at least 0.125 s, optionally at least 0.14 s, optionally at least 0.17 s. Accordingly, a full position fix or navigation solution may be calculated with a frequency of at most 8 Hz, optionally at most 7 Hz, or optionally at most 6 Hz.

Typically, the time interval between the first and fourth times is greater than the time interval between the second and third times (irrespective of the absolute duration of either interval). That is, the full position fix (or full navigation solution) is calculated less frequently (and typically with higher latency) than the time-differenced carrier range position fix.

Calculating the position difference between the first position and the second position may comprise compensating for a change in ionospheric delay experienced by GNSS signals received from the at least one satellite between the first time and the second time.

The GNSS measurements may comprise or consist of measurements in a single GNSS band for each satellite. For example, all of the GNSS measurements may be measurements of signals in an L1 band. The use of a single GNSS band (per satellite, or for all satellites) may help to reduce the complexity and cost of the GNSS receiver. However, single-frequency GNSS receivers cannot compensate for ionospheric delay by making dual-frequency measurements. Compensating for the change in ionospheric delay is therefore particularly useful for such low-cost receivers.

Calculating the position difference between the first position and the third position may comprise compensating for a change in ionospheric delay experienced by GNSS signals received from the at least one satellite between the first time and the third time.

The compensating optionally comprises: calculating a first elevation of the at least one satellite at the first time; calculating a second elevation of the at least one satellite at the second time; estimating a first ionospheric delay associated with the first elevation; estimating a second ionospheric delay associated with the second elevation; and calculating the change ionospheric delay by comparing the first and second ionospheric delays.

The estimation of the first and second ionospheric delays may be based on an ionospheric correction model. Suitable models include but are not limited to: the Klobuchar ionospheric model; and the NeQuick-G ionospheric model.

The change in ionospheric delay may be compensated for based on an ionospheric correction model, wherein the ionospheric correction model is parameterised by ionospheric coefficients broadcast by at least one of the plurality of satellites.

Also provided is a computer program comprising computer program code configured to cause one or more physical computing devices to carry out all the steps of a method as summarized above when the computer program is executed by said one or more physical computing devices. The computer program may be stored on a computer readable medium, optionally a non-transitory computer readable medium. The one or more physical computing devices may comprise or consist of one or more processors of a GNSS receiver.

Also provided is a GNSS receiver comprising:
a signal processing unit; and
at least one processor, configured to:
 obtain, from the signal processing unit, first GNSS measurements made by the signal processing unit at a first position and a first time, the first GNSS measurements comprising first pseudorange measurements and first carrier range measurements associated with a plurality of GNSS satellites observed by the GNSS receiver;
 obtain satellite ephemeris data for at least one satellite among the plurality of satellites;
 estimate a first satellite position and a first satellite velocity for the at least one satellite, for the first time, based on the obtained satellite ephemeris data;
 calculate a first position solution, based on the first GNSS measurements;
 obtain, from the signal processing unit, second GNSS measurements made by the signal processing unit at a second position and a second time, the second GNSS measurements comprising second carrier range measurements associated with the plurality of GNSS satellites;
 predict a change in satellite position for the at least one satellite between the first time and the second time, based on the first satellite position and the first satellite velocity;
 determine, for each of the plurality of satellites, a change in carrier range over time, by comparing the first carrier range measurements with the second carrier range measurements;
 calculate a position difference between the first position and the second position, based on the determined changes in carrier range and the predicted change in satellite position; and
 calculate a second position solution for the GNSS receiver, by combining the first position solution with the position difference.

The GNSS receiver may further comprise an RF front-end. The RF front-end may be configured to receive GNSS signals via an antenna. The signal processing unit may be configured to make GNSS measurements (for example, pseudorange measurements and/or carrier range measurements) on the GNSS signals received by the RF front-end.

According to another aspect (not presently claimed) there is provided a method of estimating a position of a GNSS receiver based on GNSS signals, the method comprising:
 obtaining first GNSS measurements made by a signal processing unit of the GNSS receiver at a first position and a first time, the first GNSS measurements comprising first pseudorange measurements and first carrier range measurements associated with a plurality of GNSS satellites observed by the GNSS receiver;
 calculating a first position solution for the GNSS receiver, based on the first GNSS measurements;
 obtaining second GNSS measurements made by the signal processing unit at a second position and a second time, the second GNSS measurements comprising second carrier range measurements associated with the plurality of GNSS satellites;

determining, for each of the plurality of satellites, a change in carrier range over time, by comparing the first carrier range measurements with the second carrier range measurements;

calculating a position difference between the first position and the second position, based on the determined changes in carrier range; and calculating a second position solution for the GNSS receiver, by combining the first position solution with the position difference.

This aspect may be combined with any of the optional features summarised previously above.

In particular, there is provided a method of estimating a position of a GNSS receiver based on GNSS signals, the method comprising:

obtaining first GNSS measurements made by a signal processing unit of the GNSS receiver at a first position and a first time, the first GNSS measurements comprising first pseudorange measurements and first carrier range measurements associated with a plurality of GNSS satellites observed by the GNSS receiver;

calculating a first position solution for the GNSS receiver, based on the first GNSS measurements;

obtaining second GNSS measurements made by signal processing unit at a second position and a second time, the second GNSS measurements comprising second carrier range measurements associated with the plurality of GNSS satellites;

determining, for each of the plurality of satellites, a change in carrier range over time, by comparing the first carrier range measurements with the second carrier range measurements;

calculating a position difference between the first position and the second position, based on the determined changes in carrier range, wherein said calculating the position difference comprises compensating for a change in ionospheric delay experienced by GNSS signals received from the at least one satellite between the first time and the second time; and calculating a second position solution for the GNSS receiver, by combining the first position solution with the position difference.

BRIEF DESCRIPTION OF THE DRAWINGS

The invention will now be described by way of example with reference to the accompanying drawings, in which.

Figure 1:
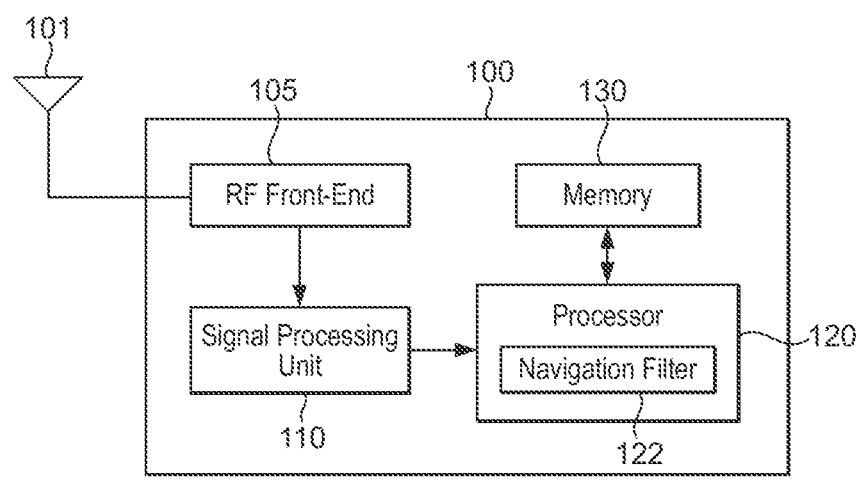
FIG. 1 is a block diagram of a GNSS receiver according to an example.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to examples according to the present disclosure, which are illustrated in the accompanying drawings. The scope of the present disclosure should not be construed as being limited to the descriptions given in this section; other examples may have different forms. These and other features, aspects, and advantages of the apparatus, systems and methods of the present disclosure will become better understood from the following description, appended claims, and accompanying drawings. It should be understood that the same reference numerals are used throughout the Figures to indicate the same or similar parts.

FIG. 1 is a schematic block diagram of a device according to an example. The device comprises a GNSS antenna 101 and a GNSS receiver 100. The GNSS antenna 101 is configured to receive GNSS signals. It may be configured to receive GNSS signals from a single GNSS constellation (for example, GPS), or it may be configured to receive GNSS signals from multiple constellations (for example, GPS, Galileo, GLONASS, and/or BeiDou). The GNSS receiver 100 comprises an RF front-end 105, a signal processing unit 110, a processor 120, and a memory 130. The RF front-end 105 is configured to receive GNSS signals via the GNSS antenna 101, and to output them to the signal processing unit 110. The RF front-end 105 is configured to down-convert and digitise the satellite signals received via the antenna 101. The RF front-end essentially conditions the signals for subsequent signal processing. Other typical tasks performed by the front-end include filtering, amplification and automatic gain control. The satellite signals received at the RF front-end 105 via the antenna 101 include at least one ranging signal, such as an L1 C/A signal, for each of a plurality of satellites. The signal processing unit 110 is configured to track the received GNSS signals—for example, in frequency, delay (code-phase) and carrier phase—and to produce GNSS measurements from the received GNSS signals. The processor 120 is configured to process the GNSS measurements obtained from the signal processing unit 110. While it should be understood that more than one processor may be present within the GNSS receiver 100 for implementing methods according to the present disclosure, for the purposes of the present description it is assumed that there is only one processor 120, as depicted in FIG. 1. In the present example, the processor implements a navigation filter 122, for example a Kalman filter (KF). This is an example of a recursive state estimator. At each of a plurality of time increments (epochs), the navigation filter 122 estimates the current value of a state vector of state variables, optionally with their associated uncertainties. The estimate for the current state vector is based on the estimated state from the previous epoch and the current measurements. In the context of positioning, the state variables estimated by the navigation filter 122 generally include position and time variables and optionally velocity and other variables. The memory 130 is in communication with the processor 120. The memory 130 is configured to store software/firmware to be executed by the processor 120. The software/firmware is configured to control the processor 120 to carry out a processing method according to an example. The memory may also be configured to store data that is used as input to the processor 120 and/or to store data that is output by the processor 120.

In an example according to the present disclosure, position solutions are calculated in two different ways, at respective different intervals. A full position solution—which may be computationally intensive to produce—is calculated relatively infrequently. A position update—which is less computationally intensive to produce—is calculated more frequently. The position updates are based on time-differenced carrier range measurements. That is, they examine the change in carrier phase observed by the GNSS receiver for each satellite signal over a given time interval, and use this to deduce how the position of the GNSS receiver has changed during that time interval.

Figure 2A:
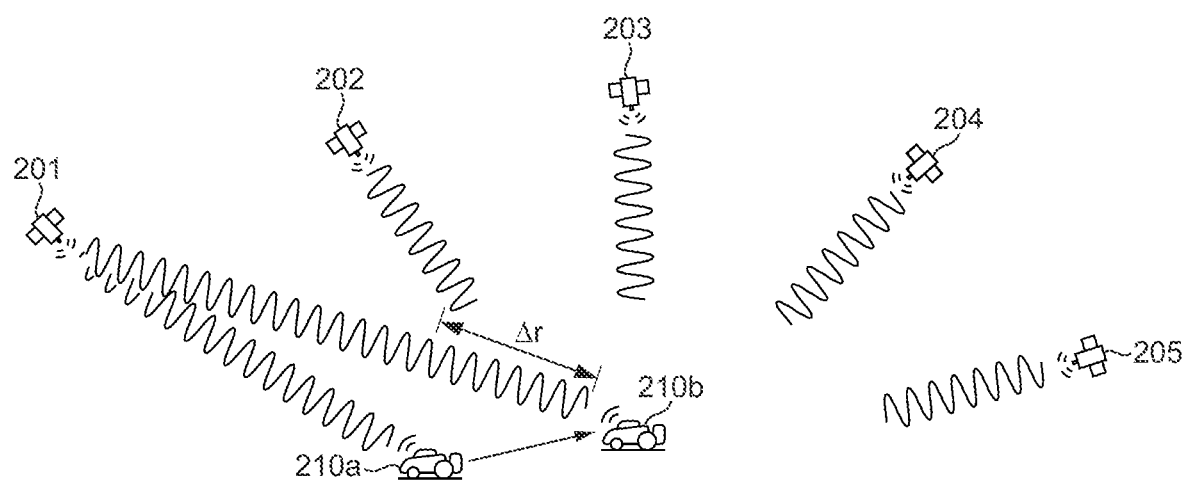
FIG. 2A illustrates how a carrier range measurement is influenced by a change in position of a GNSS receiver.

FIG. 2A illustrates the basic principle of the latter type of calculation. Five GNSS satellites 201-205 are shown. Signals from these satellites are received at a first time instant by a GNSS receiver mounted on a vehicle at a first position 210*a*. The vehicle moves to a second position (indicated by the reference numeral 210*b*). Here, the GNSS receiver receives the same satellite signals (for example, an L1 signal from each satellite) at a second time instant. Assuming that the GNSS receiver has maintained a phase lock on the signal from the satellite 201 over the time interval between the first time instant and the second time instant, carrier range (that is, carrier phase) measurements made by the signal processing unit 110 at the first time instant and the second time instant will differ by a number of cycles that depends on the change in position of the vehicle. This change in the number of cycles due to the changing position of the vehicle is indicated schematically by the dimension $\Delta_r$ in the drawing. Although the change in the number of cycles of the carrier phase measurement, i.e. delta carrier range is only indicated for one satellite 201, it should be understood that the same measurement can be made for every satellite signal for which signal phase lock has been maintained over the time interval. When considering relatively short time intervals, the requirement to maintain signal lock is not particularly onerous. Furthermore, the method can be used to deduce (uniquely) the change in position of the vehicle provided that signal phase lock has been maintained for at least four satellites. (It is not necessary that all four satellites belong to the same GNSS constellation.)

The approach of using time-differenced carrier-range measurements to deduce a position difference can enable regular rapid updates to the position solution, because the computational complexity of the calculation is low. In other words, position updates calculated in this way can be generated at a high rate, with low latency. The position updates are based solely on carrier range measurements. In this sense, they complement the "full" position solution, which is typically calculated based on (at least) pseudorange measurements. A full position solution based on pseudorange measurements is more computationally intensive to calculate. Furthermore, even if unlimited computational resources were available, there would be little benefit in calculating a full position solution based on pseudoranges with very high frequency, because the pseudorange measurements would be highly time-correlated and the additional information obtained over the short time interval would be minimal.

A challenge faced when calculating the position updates (based on the time-differenced carrier range measurements) is to ensure that they are as accurate as possible, while minimising the computational complexity and therefore the latency of the calculation. Examples according to the present disclosure seek to do this by implementing simple but effective compensation strategies, to compensate for extraneous factors influencing the carrier range measurements. By "extraneous", here, it is meant factors other than the movement of the GNSS receiver.

Figure 2B:
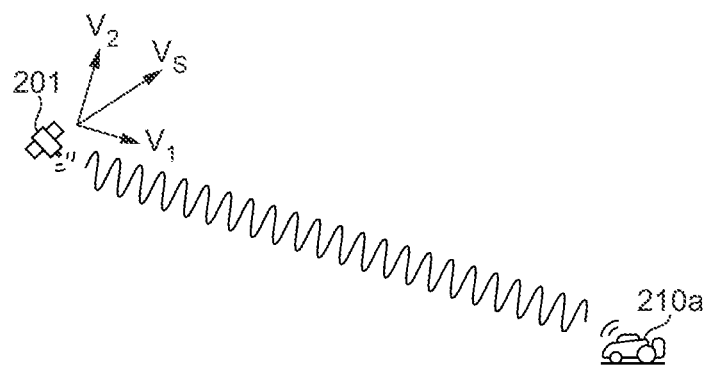
FIG. 2B illustrates how a carrier range measurement is influenced by satellite motion.

FIG. 2B illustrates one such effect influencing the change in carrier range over the time interval between a first time instant and a second time instant. In this drawing, only one satellite 201 is shown, for simplicity. However, it should be understood that the same effect applies to all of the satellites to different extents. GNSS satellites typically orbit the earth at speeds of several kilometres per second. This motion affects the carrier range measurement in the same way as motion of the GNSS receiver—the satellite motion can shorten or lengthen the range, depending on whether the satellite in question is moving towards or away from the GNSS receiver. This effect should be taken into account in order to separate and eliminate it from the calculated change in position of the GNSS receiver. In an example according to the present disclosure, the satellite position, velocity, and acceleration are estimated when calculating the "full" position solution (from the GNSS measurements made at the first time instant). The satellite clock drift may also be determined. These parameters can then be used to predict the change in satellite position (and clock) between the first time instant and the second time instant. As shown in the drawing, the satellite 201 is moving with velocity $V_s$ at the first time instant. This velocity is projected onto the line-of-sight (LoS) vector at the first time instant between the satellite 201 and the GNSS antenna mounted on the vehicle. The component $V_1$ of the satellite velocity that lies along this line-of-sight vector is the component that affects the carrier range. A residual component $V_2$ of the satellite velocity, which is orthogonal to the line of sight, can be ignored, since it does not affect the carrier range. Knowing the velocity component $V_1$ that lies along the line of sight, the change in satellite position at a second time instant along the line of sight can be calculated. This may be done using a constant velocity model; however, in the present example a (more accurate) constant acceleration model is used. The change in satellite position along the line of sight, over the time interval, creates a corresponding change in the carrier range measurement. Therefore, by predicting the change in satellite position and taking this into account, the carrier range measurements can be corrected for this effect and made more accurate.

In the present example, the correction model for satellite motion assumes that the direction of the line-of-sight vector does not change over the time interval of interest. That is, the change in satellite position from the first time instant to the second time instant is modelled as a one-dimensional increase or decrease in range, along the line-of-sight vector determined in the full position solution (for the first time). This approximation does not introduce a significant error, with regard to the modelling of satellite motion. However, there is another effect in play that does depend on the angle of arrival of the satellite signal. This is the effect of ionospheric delay. Satellite signals propagating through the ionosphere are delayed to different extents depending on the elevation of the respective satellite. This is because a satellite signal arriving from a satellite that is directly overhead (i.e. at the zenith) has a relatively shorter path through the ionosphere; whereas a satellite signal arriving from a satellite at a low elevation (i.e. close to the horizon) has a relatively longer path to traverse through the ionosphere. The ionospheric delay experienced by the GNSS signal from the satellite 201 will therefore change, between the first time instant and the second time instant, depending on whether the satellite is rising or setting (lowering) in the sky over this time interval. Consequently, according to the present example, when calculating the position difference between the first position and the second position, a correction is applied to each carrier range measurement, to account for the change in ionospheric delay for each satellite. This is done based on the elevation of the satellite at the first time instant, and the predicted elevation of the satellite at the second time instant (calculated, in this case, using the constant acceleration model mentioned above). Each elevation is applied to a model of ionospheric delay, which outputs an estimate of ionospheric delay for that elevation. The absolute values of these estimates are not critical. The difference between them is used to compensate for the change in ionospheric effects over the time interval between the first time and the second time. Suitable ionospheric models are known in the academic literature. One such model is the Klobuchar model (Klobuchar, J., 1987. Ionospheric Time-Delay Algorithms for Single-Frequency GPS Users. IEEE Transactions on Aerospace and Electronic Systems (3), pp. 325-331). Up-to-date parameters for this model (or another ionospheric model) may be obtained by the GNSS receiver 100 by decoding a navigation message received from one or more satellites in a GNSS constellation. However, it is not essential that the ionospheric model parameters are obtained from the satellites. Depending on the model, they could be obtained from another source. For example, they could be obtained from a server computer over a network via a separate communications interface. For instance, they could be obtained wirelessly, via a data connection to a cellular communications network.

Figure 3:
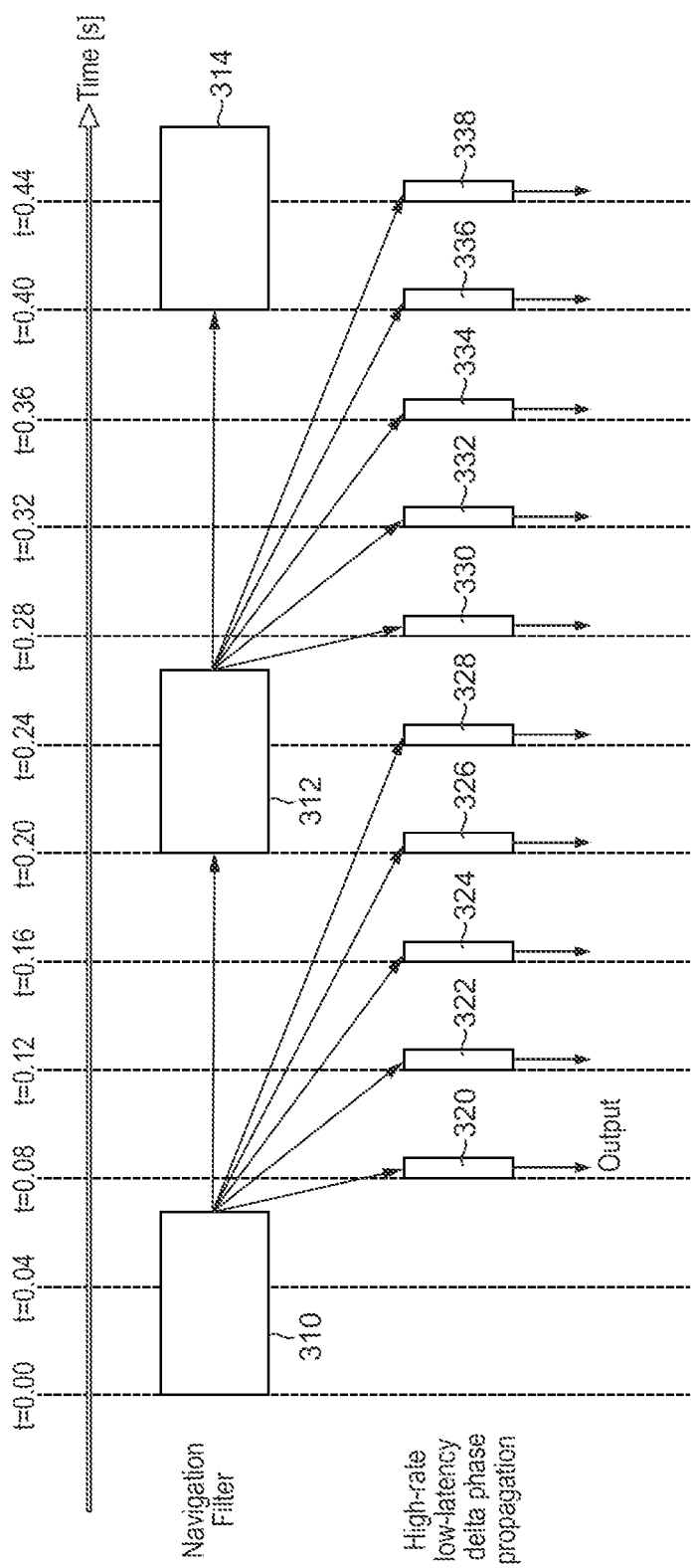
FIG. 3 is a timing diagram, illustrating a timing pattern according to which position solutions are calculated, according to an example.

FIG. 3 shows a timing diagram illustrating one possible pattern of positioning calculations, according to an example. Time is shown on the horizontal axis. A full position solution is calculated every 0.2 s—that is, at a rate of 5 Hz. The full position solution is calculated using the navigation filter 122, e.g. a Kalman filter, based on pseudorange measurements (at least). Calculating the full position solution takes a relatively long time, as indicated by the horizontal width of the blocks 310, 312, and 314 denoting these calculations. Each full position solution is used as the basis for several position updates, which are calculated with lower latency and higher frequency using time-differenced carrier range measurements. These calculations are denoted by the blocks 320-338. The position updates calculated in this way are output every 0.04 s—that is, at a rate of 25 Hz. However, as can be seen from the diagram, the time taken to complete each calculation is much shorter than this; therefore, in principle, the rate at which position updates are output could be increased considerably. The first full position solution 310 forms the basis for five position updates 320-328 based on carrier range differencing. Likewise, the next full position solution 312 forms the basis for the next five position updates 330-338.

Figure 4:
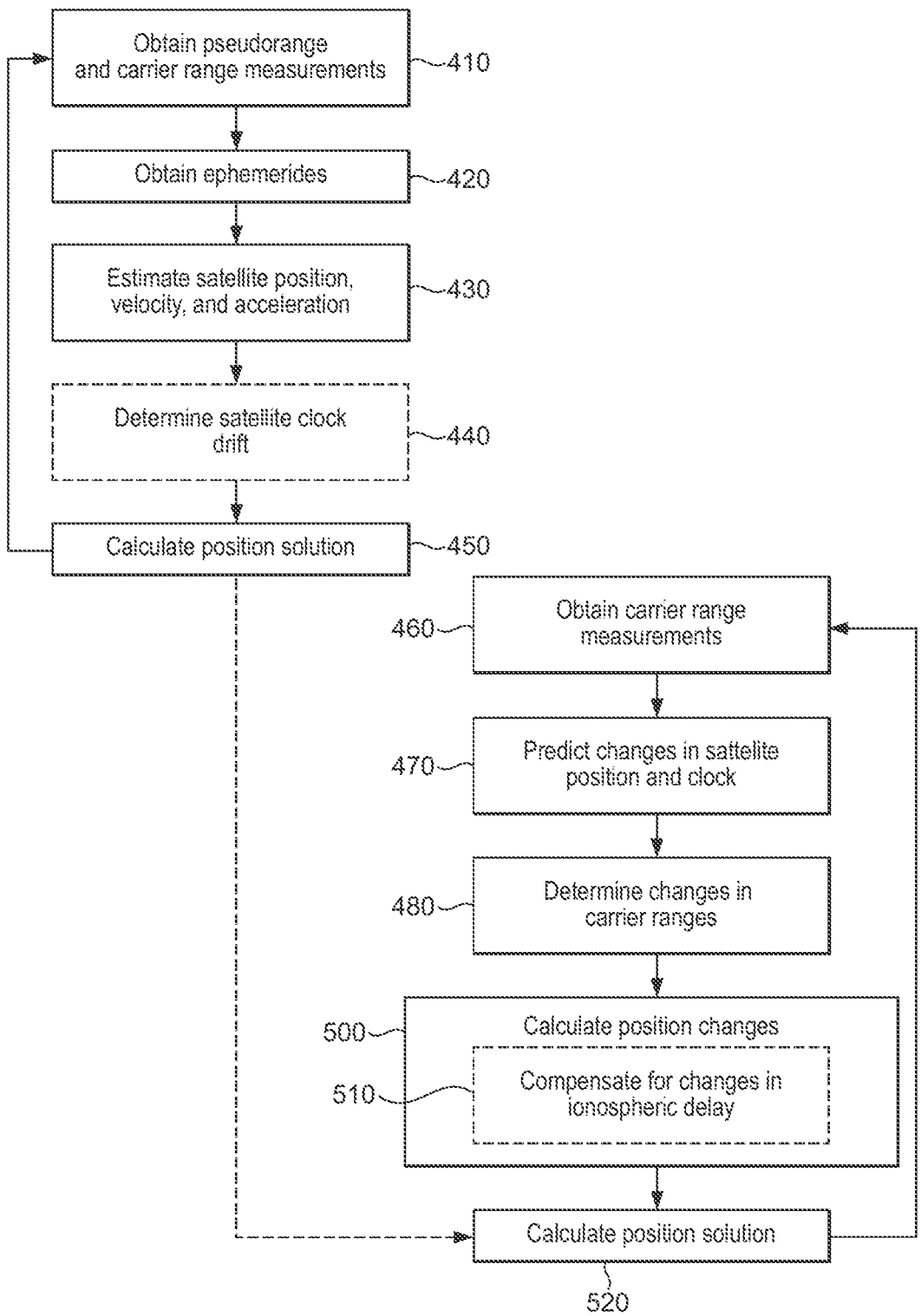
FIG. 4 is a flowchart illustrating a method of estimating a position of a GNSS receiver, according to an example.

FIG. 4 is a flowchart illustrating a method of estimating a position of a GNSS receiver, according to an example. All steps are performed by the processor 120 of the GNSS receiver 100, unless specified otherwise.

In step 410, the processor 120 obtains first GNSS measurements from the signal processing unit 110. The first GNSS measurements were made by the signal processing unit 110 at a first time and include first pseudorange measurements and first carrier range measurements for at least four satellites observed by the GNSS receiver. In step 420, the processor obtains satellite ephemeris data for each of the four satellites. It does this by decoding a sufficient duration of the navigation message of each satellite.

In step 430, the processor estimates the position, velocity, and acceleration of each satellite at the first time. This is done based on the ephemerides, i.e. ephemeris data obtained in step 420. In step 440, the processor determines a satellite clock drift of each satellite. This information can also be extracted from the ephemerides.

In step 450, the processor calculates a first position solution, based on the first GNSS measurements. In particular, by updating the navigation filter 122 with at least the first pseudo-range measurements and the satellite position information, the processor calculates a full position fix. The navigation filter may also receive and assimilate measurements from other sensors—for example, an inertial measurement unit may provide acceleration and/or angular rate of rotation measurements, or (for a vehicle-mounted GNSS receiver) a wheel rotation sensor may provide a distance measurement. The navigation filter 122 may output a navigation solution that includes more than just a position fix. For instance, the navigation solution may include other state variables such as the velocity of the GNSS receiver, the time at the GNSS receiver, and associated uncertainty information.

The processor repeats steps 410-450 for subsequent full position fixes. For example, a first iteration of these steps may correspond to the calculation 310 shown in FIG. 3. A second iteration of these steps would then correspond to the calculation 312. (Note that the second iteration of the navigation filter is also referred to herein as producing a "fourth position solution".)

In step 460, the processor obtains second GNSS measurements from the signal processing unit 110. The second GNSS measurements were made by the signal processing unit 110 at a second time, and include second carrier range measurements for the same four satellites that were the subject of the measurements in step 410. As mentioned previously above, it is assumed that phase lock is maintained for the relevant satellite signals between the first time and the second time. According to the present example, the second GNSS measurements do not include pseudorange measurements—they consist solely of the second carrier range measurements. This is not essential. In other examples, the second GNSS measurements could include pseudoranges.

In step 470, the processor predicts the change in each satellite's position (and clock) between the first time and the second time. This is done by extrapolating from the respective satellite positions (and clocks) at the first time, using the velocities and accelerations estimated in step 430 and the satellite clock drift determined in step 440. As mentioned above, in the present example, this extrapolation is based on a constant acceleration model. The prediction 470 involves, in particular, predicting the change in satellite position along the respective line-of-sight vector from each satellite to the GNSS receiver. This will be described in greater detail below, with reference to FIG. 5.

In step 480, the processor determines, for each satellite, the change in carrier range between the first time and the second time. This is done by comparing the first carrier range measurements (made by the signal processing unit 110 at the first time) with the second carrier range measurements (made by the signal processing unit 110 at the second time).

In step 500, the processor calculates the position difference between the first position and the second position. It does this based on the change in carrier range for each satellite, determined in step 480, and the predicted change in satellite position and clock, obtained in step 470. Essentially, the observed change in carrier range for each satellite (from step 480) is adjusted based on the predicted change in satellite position and clock (from step 470), in order to compensate for the motion and clock drift of the satellite over the time interval between the first time and the second time. According to the present example, the calculation in step 500 also comprises a step 510 of compensating for the change in ionospheric delay for each satellite over the time interval between the first time and the second time. This will be described in greater detail below, with reference to FIG. 6.

In step 520, the processor combines the position difference, which was calculated in step 500, with the first (full) position solution, which was calculated in step 450, to produce a second position solution. As discussed above, this second position solution is a high-rate and low-latency position update. By adding the position difference to the previously calculated position solution, the processor can produce a position update (second position solution) with low latency. Referring to the diagram of FIG. 3, this second position solution corresponds to the output of calculation 320.

The processor repeats steps 460-520 for subsequent position updates. For example, the second iteration of these steps corresponds to the calculation 322 in FIG. 3. (This calculation is also referred to herein as producing a "third position solution".)

Figure 5:
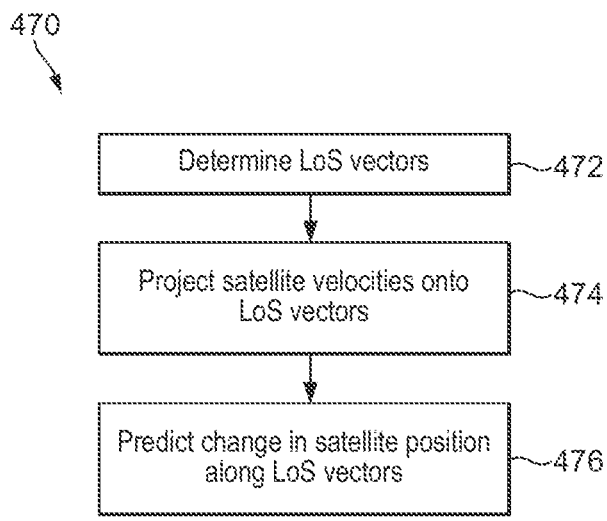
FIG. 5 is a flowchart illustrating a method of predicting a change in satellite position and satellite clock, for use in the method of FIG. 4.

FIG. 5 is a flowchart illustrating a method of predicting a change in satellite position and satellite clock, for use in the method of FIG. 4. In step 472, the processor determines a respective line-of-sight vector between the GNSS receiver and each of the four satellites. Each line-of-sight vector is determined from the vector that joins (in the geometric sense) the first position solution (from step 450) with the satellite position at the first time (from step 430). For the purposes of predicting and compensating for the change in satellite position, these line-of-sight vectors are assumed to remain fixed over the update interval of the navigation filter. That is, the line-of-sight vectors are assumed to be the same in each iteration 320-328 of the position update calculation. It should be understood that the line-of-sight vectors are updated at each epoch of the navigation filter 122 (e.g. Kalman filter). Therefore, updated line-of-sight vectors are produced in the calculation 312.

In step 474, the processor projects each satellite's velocity vector onto its respective line-of-sight vector. In this way, the processor identifies the component of satellite motion that lies in the direction towards (or away from) the GNSS receiver. In step 476, the processor predicts the change in each satellite's position along the respective line-of-sight vector. This can be done by integrating the velocity component along the line-of-sight sector with respect to time, over the time interval between the first time and the second time. As mentioned above, in the present example, the change in satellite position is modelled using a constant acceleration model.

Figure 6:
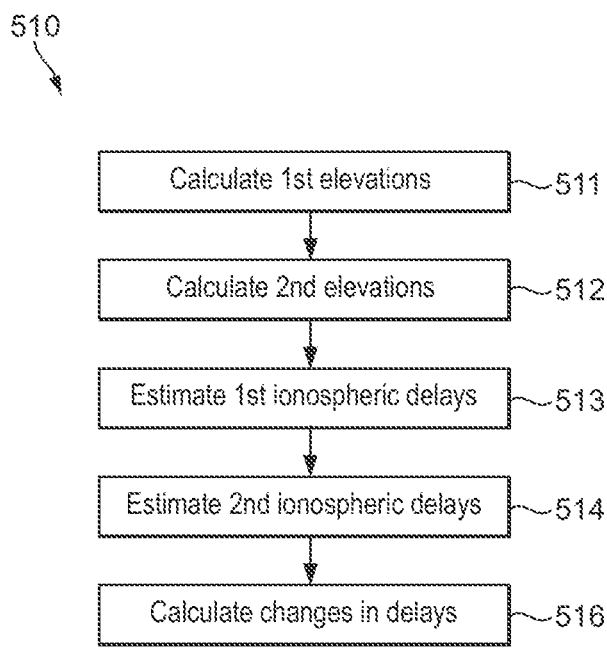
FIG. 6 is a flowchart illustrating a method of compensating for changes in ionospheric delay, for use in the method of FIG. 4.

FIG. 6 is a flowchart illustrating a method of compensating for changes in ionospheric delay, for use in the method of FIG. 4. In step 511, the processor calculates the elevation of each satellite at the first time. This is done based on the satellite positions estimated in step 430 (or, equivalently, based on the line-of-sight vectors determined in step 472). In step 512, the processor calculates the elevation of each satellite at the second time. This is done based on predicted satellite positions at the second time, obtained by extrapolating using the satellite velocity $V_s$ for each satellite. Again, in the present example, the extrapolation is based on a constant acceleration model. Note that, in some examples, the new elevation could be predicted by extrapolation based solely on the component $V_2$ of the satellite velocity that is orthogonal to the line-of-sight vector (or, in particular, the component of $V_2$ that is perpendicular to the horizon). In step 513, using the satellite elevations at the first time and the ionospheric model, the processor estimates the ionospheric delays associated with the first carrier range measurements. Similarly, in step 514, using the (predicted) satellite-elevations at the second time, and the same ionospheric model, the processor estimates the ionospheric delays associated with the second carrier range measurements. Then, in step 516, the processor calculates, for each satellite signal, the expected change in ionospheric delay caused by the change in elevation of the respective satellite over the time interval between the first time and the second time. This is done by calculating the difference between the ionospheric delays estimated in step 513 and those estimated in step 514. The changes in ionospheric delay, calculated in step 516, are used in step 500 discussed above in relation to FIG. 4. When calculating the position difference in step 500, the (observed) changes in carrier range are adjusted using the respective calculated changes in ionospheric delay, in order to compensate for the latter (ionospheric delay) changes.

The present example uses the Klobuchar ionospheric model, mentioned previously above.

It should be understood that the above-mentioned examples illustrate rather than limit the invention, and that those skilled in the art will be able to design many alternative examples without departing from the scope of the appended claims.

For example, it is not essential that all of the method steps illustrated in FIGS. 4-6 are performed in the order shown. Certain method steps could be carried out in a different order, or calculations could be performed in different combinations. For example, in FIG. 4, the step of compensating for the change in ionospheric delay (step 510) is illustrated as part of the step of calculating the position difference (step 500). However, it would also be possible to perform this compensation in step 480, when determining the changes in carrier ranges.

The Klobuchar ionospheric model was mentioned above. It should be understood that other ionospheric models are available and may be used to estimate the change in ionospheric delay for each satellite signal. One such model is the NeQuick-G model.

The approach of using an ionospheric model to model the effect of varying ionospheric delay may be used by a single frequency GNSS receiver. Such a receiver may receive and make measurements of L1 signals, for example. In other implementations, a dual frequency GNSS receiver may be used. For example, a signal processing unit of a dual frequency GNSS receiver may make measurements of an L1 signal and an L2 signal from each satellite. With a dual frequency receiver, ionosphere-free GNSS measurements are possible, using methods known in the art. The use of a parametric model to correct carrier range measurements may be unnecessary in such dual frequency implementations.

Although the examples above have described adjusting the carrier range calculations to compensate for (i) satellite motion and (ii) changes in ionospheric delay, the method is not limited to compensating only for these factors. For example, compensation for changes in tropospheric delay may also be applied. Appropriate models for tropospheric delay are known in the art.

In the example illustrated in FIG. 3, each subsequent high-rate position update 322-328 is calculated with reference to the full position solution 310. That is, the "new" carrier range measurements in each iteration are always compared with the first carrier range measurements. In some alternative examples, the comparison could be made between other pairs of carrier range measurements. For example, the comparison could be done incrementally—comparing the "new" carrier range measurements in each iteration 322-328 with those made in the respective preceding iteration 320-326.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The examples may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various examples may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Examples as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of estimating a position of a Global Navigation Satellite System (GNSS) receiver based on GNSS signals, the method comprising:
    obtaining first GNSS measurements made by a signal processing unit of the GNSS receiver at a first position and a first time, the first GNSS measurements comprising first pseudorange measurements and first carrier range measurements associated with a plurality of GNSS satellites observed by the GNSS receiver;
    obtaining satellite ephemeris data for at least one satellite among the plurality of satellites;
    estimating a first satellite position and a first satellite velocity for the at least one satellite, for the first time, based on the obtained satellite ephemeris data;
    calculating a first position solution for the GNSS receiver, based on the first GNSS measurements;
    obtaining second GNSS measurements made by the signal processing unit of the GNSS receiver at a second position and a second time, the second GNSS measurements comprising second carrier range measurements associated with the plurality of GNSS satellites;
    predicting a change in satellite position for the at least one satellite between the first time and the second time, based on the first satellite position and the first satellite velocity;
    determining, for each of the plurality of satellites, a change in carrier range over time, by comparing the first carrier range measurements with the second carrier range measurements;
    calculating a position difference between the first position and the second position, based on the determined changes in carrier range and the predicted change in satellite position; and
    calculating a second position solution for the GNSS receiver, by combining the first position solution with the position difference.

2. The method of claim 1, further comprising estimating a first satellite acceleration for the at least one satellite, for the first time, based on the obtained satellite ephemeris data, wherein the change in satellite position is predicted based on the first satellite position, the first satellite velocity, and the first satellite acceleration.

3. The method of claim 1, further comprising determining a satellite clock drift for the at least one satellite between the first time and the second time, based on the obtained satellite ephemeris data, and
    predicting a change in satellite clock for the at least one satellite between the first time and the second time, based on the satellite clock drift.

4. The method of claim 1, wherein predicting the change in satellite position comprises:

determining a line-of-sight vector between the GNSS receiver and the at least one satellite, based on the first position solution and the first satellite position;

projecting the first satellite velocity onto the line-of-sight vector; and predicting the change in satellite position along the line-of-sight vector based on the projected first satellite velocity.

5. The method of claim 1, wherein the first position solution is calculated by a navigation filter.

6. The method of claim 1, further comprising:

obtaining third GNSS measurements made by the signal processing unit of the GNSS receiver at a third position and a third time, the third GNSS measurements comprising third carrier range measurements associated with the plurality of GNSS satellites;

predicting a change in satellite position for the at least one satellite between the first time and the third time, based on the first satellite position and the first satellite velocity;

determining, for each of the plurality of satellites, a change in carrier range over time, by comparing the first carrier range measurements with the third carrier range measurements;

calculating a second position difference between the first position and the third position, based on the determined changes in carrier range and the predicted change in satellite position between the first time and the third time; and calculating a third position solution for the GNSS receiver, by combining the first position solution with the second position difference.

7. The method of claim 6, wherein a time interval between the second time and the third time is less than 0.125 s.

8. The method of claim 1, further comprising:

obtaining fourth GNSS measurements made by the signal processing unit of the GNSS receiver at a fourth position and a fourth time, the fourth GNSS measurements comprising second pseudorange measurements and fourth carrier range measurements associated with a second plurality of GNSS satellites observed by the GNSS receiver; and calculating a fourth position solution for the GNSS receiver, based on the fourth GNSS measurements.

9. The method of claim 8, further comprising:

obtaining satellite ephemeris data for at least one satellite among the second plurality of satellites; and estimating a fourth satellite position and second satellite velocity for said at least one satellite, for the fourth time, based on the obtained satellite ephemeris data.

10. The method of claim 8, wherein a time interval between the first time and the fourth time is at least 0.125 s.

11. The method of claim 1, wherein calculating the position difference between the first position and the second position comprises compensating for a change in ionospheric delay experienced by GNSS signals received from the at least one satellite between the first time and the second time.

12. The method of claim 11, wherein the compensating comprises:

calculating a first elevation of the at least one satellite at the first time;

calculating a second elevation of the at least one satellite at the second time;

estimating a first ionospheric delay associated with the first elevation;

estimating a second ionospheric delay associated with the second elevation; and calculating the change ionospheric delay by comparing the first and second ionospheric delays.

13. The method of claim 11, wherein the change in ionospheric delay is compensated for based on an ionospheric correction model, wherein the ionospheric correction model is parameterized by ionospheric coefficients broadcast by at least one of the plurality of satellites.

14. At least one tangible, non-transitory, computer readable medium storing software that, when executed by one or more computing devices, cause the one or more computing devices to perform operations comprising:

obtaining first Global Navigation Satellite System (GNSS) measurements made by a signal processing unit of a GNSS receiver at a first position and a first time, the first GNSS measurements comprising first pseudorange measurements and first carrier range measurements associated with a plurality of GNSS satellites observed by the GNSS receiver;

obtaining satellite ephemeris data for at least one satellite among the plurality of satellites;

estimating a first satellite position and a first satellite velocity for the at least one satellite, for the first time, based on the obtained satellite ephemeris data;

calculating a first position solution for the GNSS receiver, based on the first GNSS measurements;

obtaining second GNSS measurements made by the signal processing unit of the GNSS receiver at a second position and a second time, the second GNSS measurements comprising second carrier range measurements associated with the plurality of GNSS satellites;

predicting a change in satellite position for the at least one satellite between the first time and the second time, based on the first satellite position and the first satellite velocity;

determining, for each of the plurality of satellites, a change in carrier range over time, by comparing the first carrier range measurements with the second carrier range measurements;

calculating a position difference between the first position and the second position, based on the determined changes in carrier range and the predicted change in satellite position; and calculating a second position solution for the GNSS receiver, by combining the first position solution with the position difference.

15. A GNSS receiver comprising:

a signal processing unit; and at least one processor, configured to:

obtain, from the signal processing unit, first GNSS measurements made by the signal processing unit at a first position and a first time, the first GNSS measurements comprising first pseudorange measurements and first carrier range measurements associated with a plurality of GNSS satellites observed by the GNSS receiver;

obtain satellite ephemeris data for at least one satellite among the plurality of satellites;

estimate a first satellite position and a first satellite velocity for the at least one satellite, for the first time, based on the obtained satellite ephemeris data;

calculate a first position solution, based on the first GNSS measurements;

obtain, from the signal processing unit, second GNSS measurements made by the signal processing unit at a second position and a second time, the second GNSS measurements comprising second carrier range measurements associated with the plurality of GNSS satellites;

predict a change in satellite position for the at least one satellite between the first time and the second time, based on the first satellite position and the first satellite velocity;

determine, for each of the plurality of satellites, a change in carrier range over time, by comparing the first carrier range measurements with the second carrier range measurements;

calculate a position difference between the first position and the second position, based on the determined changes in carrier range and the predicted change in satellite position; and calculate a second position solution for the GNSS receiver, by combining the first position solution with the position difference.

\* \* \* \* \*